(12) United States Patent
Woods et al.

(10) Patent No.: US 10,190,646 B2
(45) Date of Patent: Jan. 29, 2019

(54) SERVICING SYSTEM AND METHOD FOR SERVICING A BRAKE DEVICE OF A BRAKE SYSTEM HAVING A HORIZONTALLY ARRANGED BRAKE DISC

(71) Applicant: S.B. Patent Holding ApS, Vejstrup (DK)

(72) Inventors: James A. W. Woods, Hesselager (DK); Michael Lang, Stenstrup (DK)

(73) Assignee: S.B. Patent Holding ApS, Vejstrup (DK)

( * ) Notice: Subject to any disclaimer, the term of this patent is extended or adjusted under 35 U.S.C. 154(b) by 247 days.

(21) Appl. No.: 15/182,685

(22) Filed: Jun. 15, 2016

(65) Prior Publication Data

US 2017/0067519 A1  Mar. 9, 2017

(30) Foreign Application Priority Data

Sep. 4, 2015 (EP) ..................................... 15183806
Feb. 26, 2016 (EP) ..................................... 16157595

(51) Int. Cl.
*B23P 19/04* (2006.01)
*F16D 65/00* (2006.01)
(Continued)

(52) U.S. Cl.
CPC .......... *F16D 65/0043* (2013.01); *B25B 11/02* (2013.01); *F03D 1/06* (2013.01);
(Continued)

(58) Field of Classification Search
CPC ......... B23P 19/00; B23P 19/006; B23P 19/02; B23P 15/18
See application file for complete search history.

(56) References Cited

U.S. PATENT DOCUMENTS 4,049,238 A * 9/1977 Brown .................... B66C 23/42
                                                      212/264
4,965,921 A * 10/1990 Priest ..................... B25B 27/02
                                                       29/244
(Continued)

FOREIGN PATENT DOCUMENTS

CN      103557249 A    2/2014
CN      203765552 U    8/2014
(Continued)

OTHER PUBLICATIONS

Search Report issued in priority European Patent Application No. 15183806.7 (dated Feb. 23, 2016).
(Continued)

*Primary Examiner* — Lee D Wilson
(74) *Attorney, Agent, or Firm* — Reising Ethington P.C.

(57) ABSTRACT

A servicing system (30 or 300) for servicing a brake device (24) of a brake system comprising the brake device (24) and a brake disc (22) is described. The servicing system (30 or 300) includes a frame (32 or 302), and the servicing system (30 or 300) is further configured for mounting the frame (32 or 302) in a fixed position relative to the brake disc (22), supporting the brake device (24) to allow the brake device (24) to be moved on the frame (32 or 302) relative to the brake disc (22) and lifting the brake device (24) to allow the brake device (24) to be raised or lowered relative to the brake disc (22).

20 Claims, 12 Drawing Sheets

(51) Int. Cl.
  *B25B 11/02* (2006.01)
  *F16D 55/225* (2006.01)
  *F03D 1/06* (2006.01)
  *F03D 7/02* (2006.01)

(52) U.S. Cl.
  CPC ......... *F03D 7/0248* (2013.01); *F16D 55/225* (2013.01); *F05B 2230/60* (2013.01); *F05B 2230/80* (2013.01); *F16D 2250/0084* (2013.01); *Y02E 10/721* (2013.01)

(56) References Cited

U.S. PATENT DOCUMENTS

| | | | |
|---|---|---|---|
| 7,032,280 B1* | 4/2006 | Ploeger | B25B 27/0035 |
| | | | 29/225 |
| 8,104,631 B2 | 1/2012 | Stegemann et al. | |
| 8,371,030 B2 | 2/2013 | Shiraishi et al. | |
| 8,789,274 B2 | 7/2014 | Bywaters et al. | |
| 2005/0081355 A1 | 4/2005 | Nechvatal | |
| 2007/0290181 A1* | 12/2007 | Bell | B60P 1/548 |
| | | | 254/323 |
| 2008/0245756 A1 | 10/2008 | Dehlsen et al. | |
| 2011/0142626 A1 | 6/2011 | Hanson et al. | |
| 2012/0125876 A1 | 5/2012 | Park et al. | |
| 2012/0224799 A1 | 9/2012 | Wagner | |
| 2016/0167933 A1* | 6/2016 | Birch | B66C 23/44 |
| | | | 254/326 |
| 2017/0067519 A1* | 3/2017 | Woods | B25B 11/02 |

FOREIGN PATENT DOCUMENTS

| | | |
|---|---|---|
| EP | 1367285 A1 | 12/2003 |
| EP | 2505541 A1 | 10/2012 |
| FR | 2865783 A1 | 8/2005 |
| FR | 2956852 A1 | 9/2011 |
| WO | 20140187510 A1 | 11/2014 |

OTHER PUBLICATIONS

Examination Report No. 1 issued in corresponding Australian Patent Application No. 2016202991 (dated Dec. 9, 2016).
Machine translation of FR 2956852.
International Search Report issued in corresponding international (PCT) patent application No. PCT/US2016/030976 (dated Aug. 11, 2016).
Written Opinion issued in corresponding international (PCT) patent application No. PCT/US2016/030976 (dated Aug. 11, 2016).
Machine Translation of written description of CN203765552U.
Search report and opinion issued in priority application EP 16157595.6 (dated Jan. 31, 2017).

* cited by examiner

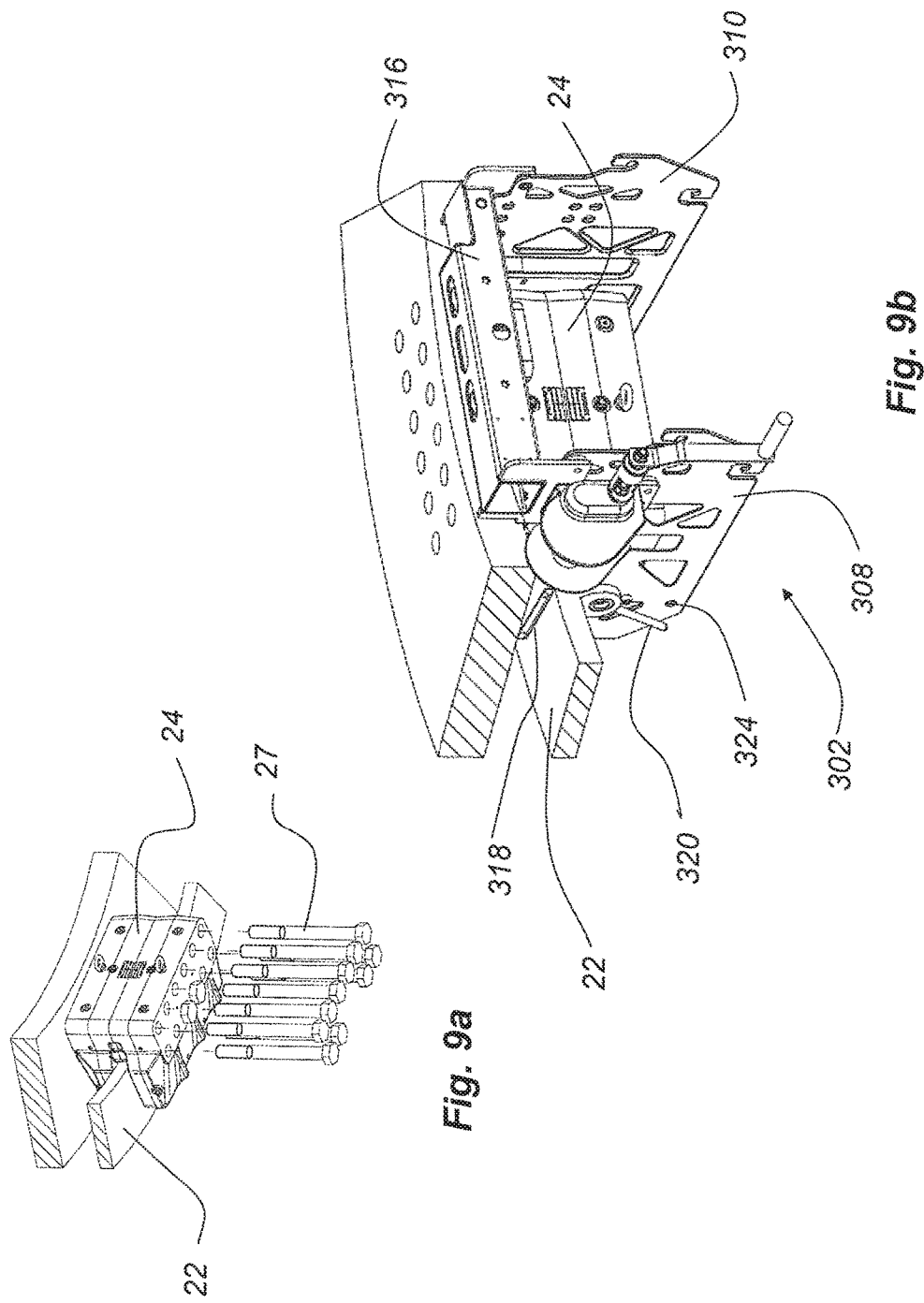

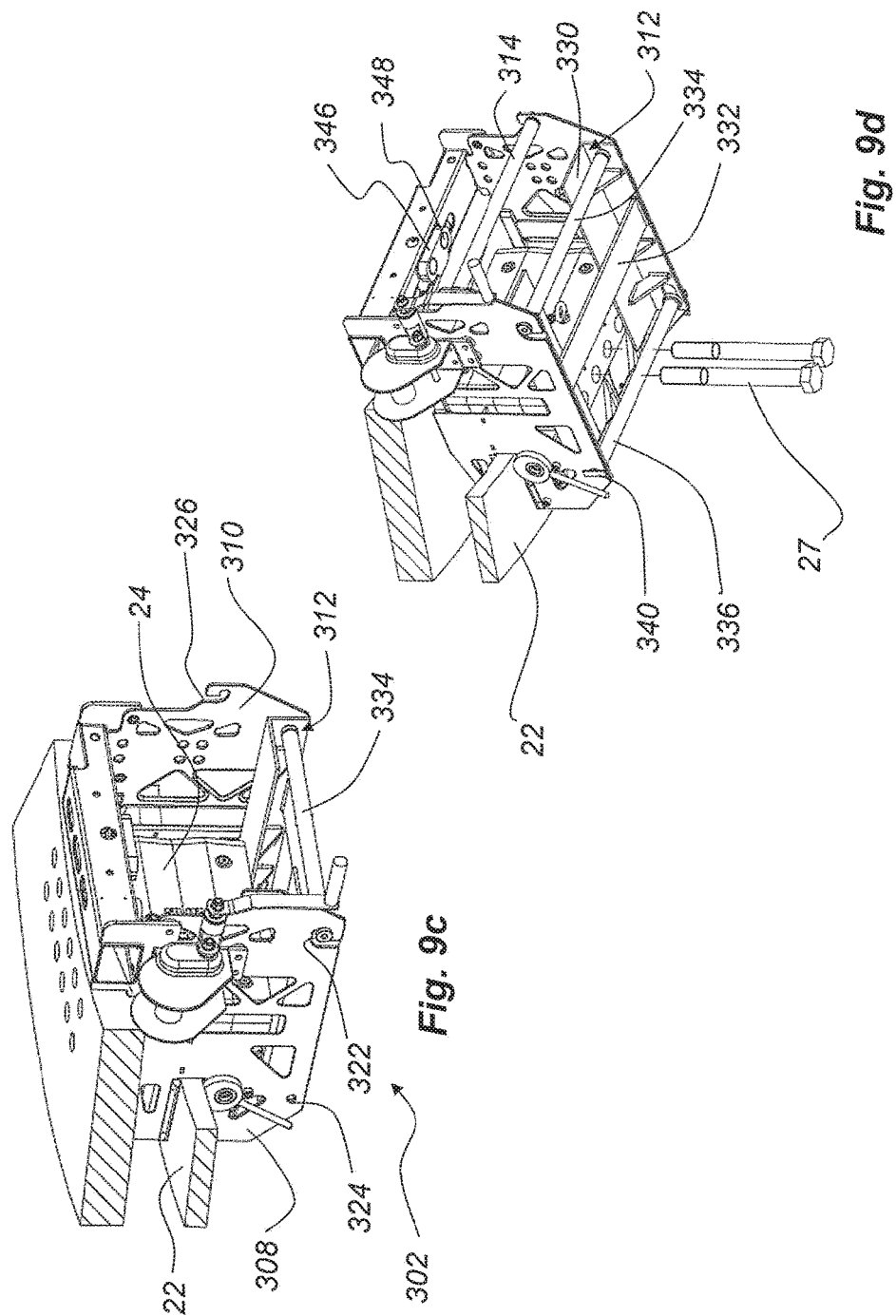

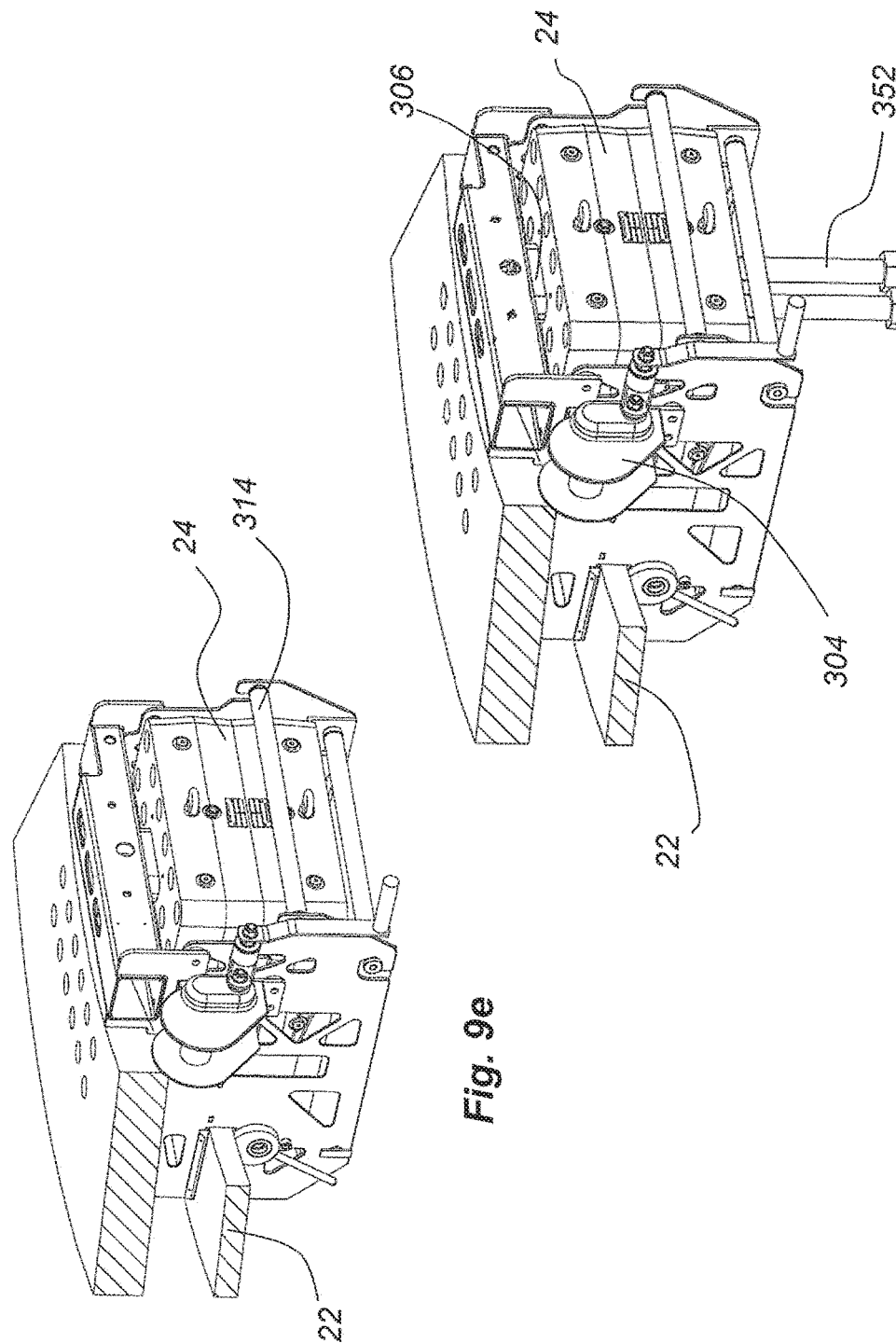

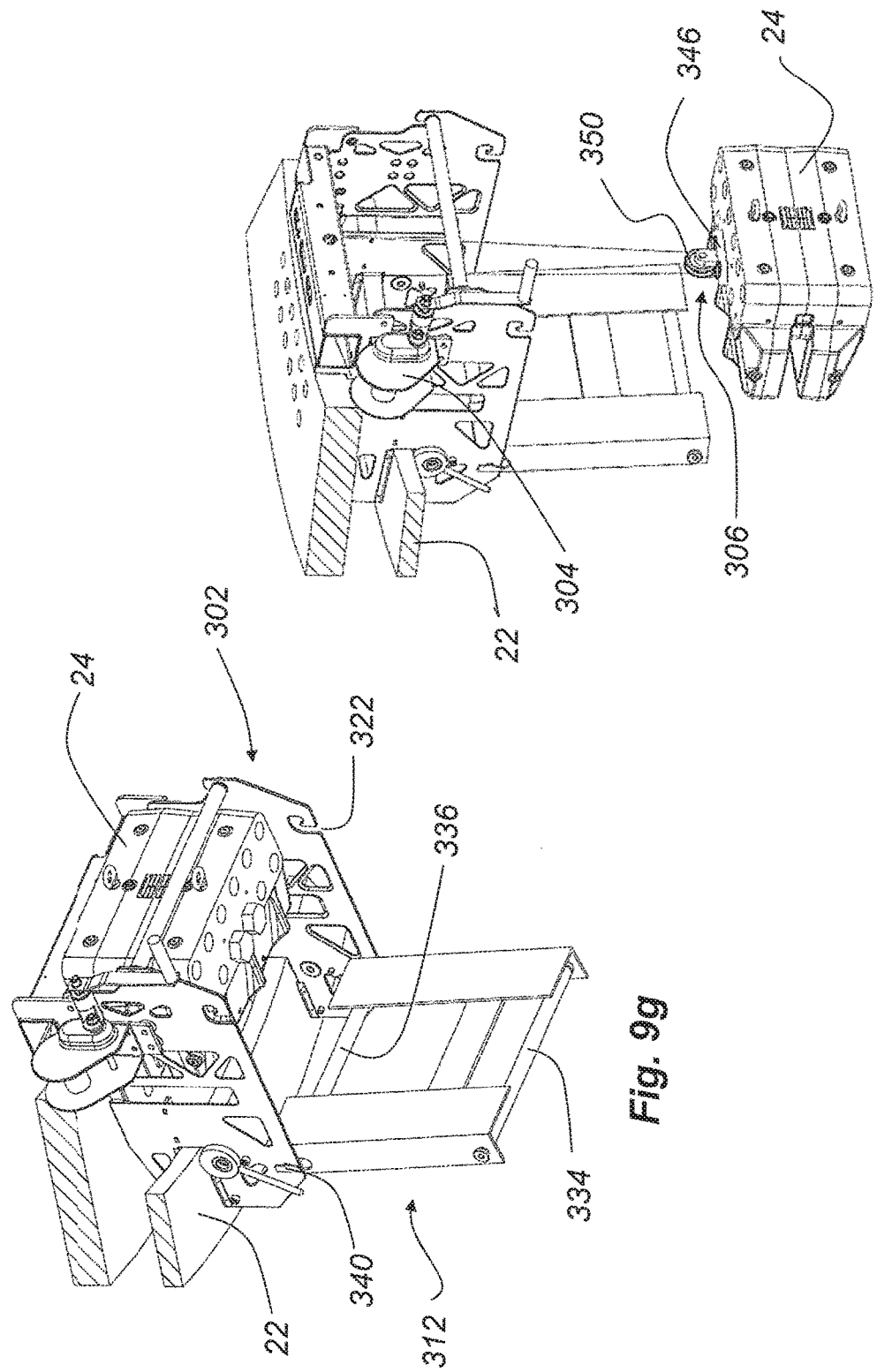

SERVICING SYSTEM AND METHOD FOR SERVICING A BRAKE DEVICE OF A BRAKE SYSTEM HAVING A HORIZONTALLY ARRANGED BRAKE DISC

TECHNICAL FIELD

The present invention relates to a servicing system as well as a method for servicing a brake device of a brake system comprising the brake device and a brake disc.

BACKGROUND

A wind turbine comprises a tower and a nacelle or machine housing supported on the tower and carrying the blades, rotor and electricity producing parts. A yaw system controls the position of the nacelle relative to the tower about a vertically extending yaw axis to thereby control orientation of the wind turbine rotor relative to the prevailing wind direction. If the wind turbine is not oriented correctly, the wind will impose uneven loads on the rotor and will seriously reduce the efficiency of the wind turbine. Therefore, the function of the yaw system is important in order to improve the efficiency and prolong the lifetime of the wind turbine.

The yaw system often comprises a toothed brake disc or ring fixed to the tower and a motor activated gear attached to the nacelle and meshing with the toothed gear so that activation of the motor results in a revolving of the nacelle thereby producing the yaw motion of the nacelle. The yaw drive or gear may also be separated from the brake disc. The yaw system may be provided with ball bearings or slide bearings for the yaw motion. The yaw system may also include one or more yaw brakes to maintain the nacelle and rotor in the correct yaw position.

The yaw brakes are typically engaged for extended periods of time in order to ensure that the nacelle is maintained in the correct position. The yaw brake typically comprises a brake calliper that in turn comprises at least one brake piston and a brake pad provided in a receiving part of the calliper. The brake disc is arranged in the receiving part of the brake calliper, and when the brake piston is engaged, the brake pad is compressed against the brake disc, thus providing a braking force due to a frictional engagement between the brake pad and the brake disc. The yaw brakes may also be partly engaged during yawing in order to control and dampen the yaw movement.

One of the problems that is encountered with yaw brakes is the large amount of effort required, when the installed yaw brakes need to be removed from the brake disc for service, such as replacing brake pads or replacing the entire yaw brake. The problems occur since the yaw brakes are typically arranged at quite a large distance from a working platform in the tower. Further, the brakes are currently handled by a service technician, which includes lifting of the yaw brake from the brake disc and down to the working platform or vice versa, which in turn is associated with health and safety risks. Additionally, current tools for assisting in lifting or lowering the yaw brakes are time-consuming to use, bulky and sometimes involve safety risks. The current tools are typically arranged on the floor of the working platform, thereby taking up floor space. Another problem with current service methods and tools is encountered due the inherent design of brake callipers, which entails that the brake calliper has to be moved horizontally before being lowered. The horizontal movement before lowering also involves safety risks in the current systems.

The service or replacement of parts of the brake is normally done at floor level, whereas the servicing tools are located at waist height, which again involves health and safety risks.

Currently, when a brake needs a complete overhaul, the brakes are usually removed from the wind turbine entirely.

DISCLOSURE OF THE INVENTION

It is an object of the invention to obtain a servicing system and a method of servicing a brake device, which overcome or ameliorate at least one of the disadvantages of the prior art or which provide a useful alternative.

According to the invention this is obtained by a servicing system for servicing a brake device of a brake system comprising the brake device and a brake disc, wherein the servicing system includes a frame, and wherein the servicing system further comprises:

mounting means for mounting the frame in a fixed position relative to the brake disc, coupling means for securing at least a part of the brake device to the frame, and guiding means which are adapted to allow said part of the brake device, while secured to the frame, to be moved on the frame relative to the brake disc.

Thereby, the invention provides a servicing system, where a servicing device may be attached in a fixed position relative to the brake disc and preferably directly to the brake disc, and where a part of the brake device, such as a brake calliper or a yoke, may be secured to the frame and removed from the brake disc to a position, where the part may be serviced.

Preferably, the securing means are adapted to allow said part of the brake device to be carried by the frame. The frame may include further means, such as ledges, for supporting and carrying the brake device on the frame.

The servicing system may be formed as an integrated servicing device for servicing the brake device. However, it may also be provided in form of a kit of parts comprising the frame and coupling means for securing at least said part of the brake device to the frame.

It is noted that the invention is particularly suited for service of brake systems having a brake disc, which is arranged and oriented substantially in a horizontal plane. Accordingly, the invention is also particularly suited for service of yaw brakes for a wind turbine.

Therefore, the invention in a first embodiment provides a servicing system for servicing a yaw brake for a wind turbine. In a second embodiment, the servicing system is adapted for mounting or demounting of at least a part of a brake device from a horizontally arranged brake disc.

However, the invention is also applicable for other brake systems having a horizontally arranged brake disc, such as slew brakes on cranes or other industry applications.

The brake disc may for instance be provided in form of a circular disc, or in form of a ring. The brake system may for instance comprise a brake calliper or be based on a slide bearing. The brake device of the system, e.g. the brake calliper may be arranged internally on the disc or externally on the disc.

In an advantageous embodiment, the guiding means are designed and adapted to allow said part of the brake device to move between a first position, wherein said part is mounted in an operating position on the brake disc, and a second position, wherein said part can be serviced or removed from the brake disc. Accordingly, the entire servicing of the part of the brake device may be carried out, while the part is secured to the frame of the servicing system, which reduces the health and safety risks significantly compared to conventional servicing tools and methods.

In an advantageous embodiment, said part of the brake device is a yoke of a brake calliper. Once, the yoke has been secured to the frame of the servicing system, the yoke can be detached or disassembled from the brake device, whereby only the yoke may be moved to the servicing position on the frame. This lowers the weight and torque that the frame needs to support or carry during service.

The mounting means may advantageously comprise a clamp, such as a screw clamp, and/or a locking cam for clamping the frame on the brake disc. In principle, it is also possible for the mounting means to clamp to other parts of the brake system or yaw system, such as for instance a part of the yaw system. However, it is particularly advantageous to mount the frame to the brake disc, since the brake disc is always in a known position. Additionally, the brake disc is a strong and rigid structure that can easily support the weight of the frame and the brake device. Further, the brake disc is obviously located at the right height for removing and installing brake devices on the brake disc.

In another advantageous embodiment, the guiding means are adapted to allow said part of the brake device to move substantially parallel to a plane of the brake disc and substantially perpendicular to the yaw axis of the brake disc. Thereby, the part can be removed from the brake device and the brake disc without damage to any of the parts. However, it is also possible to design the guiding means so that the part is moved out of the plane of brake disc, e.g. in an angle relative to the plane of the brake disc or the yaw axis of the brake disc.

In a highly advantageous embodiment, the guiding means comprise one or more slots. Accordingly, the part may be secured to the frame via the slot, and the part may be moved along slot on the frame.

The coupling means may advantageously comprise one or more fixing pins for guiding said part of the brake device along the slot by inserting said one or more fixing pins in the slot. The fixing pins secures the part to the frame via the slot. The coupling means may also simply or in additionally be provided in form of a shelf on which the part of the brake device may rest and thus be securely carried by the frame.

In another embodiment, the guiding means may comprise a rail or rails for guiding said part of the brake device. Similarly, the coupling means may comprise means, such as a pin or a screw and bolt connection for securing said part of the brake device to the rail or rails.

In principle, the coupling means and the guiding means may be integrated as a single device. The brake device or brake yoke may comprise protrusions (similar to the pins), which may engage the slot or rail of the frame. In this case, the slot or rail also functions so as to carry said part of the brake device. It is also possible to design the frame such that the frame is secured over and under the brake device, such that the frame or slots in the frame may carry the entire brake device.

In another embodiment, the frame comprises a first mounting means for fixing the frame on a first side of the brake device and a second mounting means for fixing the frame on a second side of the brake device. This provides a servicing system, where the frame may securely be fixed to the brake disc and provides a secure base for carrying the part of the brake device or the entire brake device.

The first mounting means may be provided in first side frame of the frame, and the second mounting means is provided on a second side frame of the frame.

The first and the second side frame may each be provided with a slot, such that a first fixing pin is used on a first side of said part of the brake device and a second fixing pin is used on a second side of said part of the brake device. Accordingly, the first fixing pin may be attached to a first side of the part and the second fixing pin may be attached to a second side of the part. The first fixing pin may in turn be arranged in a first slot in the first side frame and the second fixing pin be arranged in a second slot in the second side frame, respectively.

In one embodiment, the coupling means and/or the guiding means are adapted to allow said part of the brake device to rotate relative to the frame.

The servicing system may also comprise coupling means for securing said part of brake device to the frame in two different radial positions. This may for instance be achieved by securing said part with fixing pins at two different radial positions, e.g. on both sides of the brake device. This will allow said part to be moved along the guiding means, e.g. in form of a slot or a rail, without the part having a tendency to rotate on the frame due to its own weight.

The guiding means, e.g. the slot or rail, may be curved such that said part of the brake device is rotated as it is moved along the guiding means. The guiding means may for instance be designed so that the part is automatically moved to an optimum service position, when the part is moved along the frame.

In one embodiment, the frame is further provided with a stop for said part to rest against in a rotated position. The stop may for instance extend as a cross-bar between the first side frame and the second side frame.

The frame may further be provided with a lifting device, such as a winch, for lowering or lifting said part relative to the frame. Accordingly, the part may safely be lowered onto for instance a work platform below the yaw brake system.

In an advantageous embodiment, the frame comprises first coupling means and first guiding means for carrying and moving a first part of the brake device, and second coupling means and second guiding means for carrying and moving a second part of the brake device. When mounted in the fixed position relative to the brake disc, the first coupling means and guiding means may advantageously be position above the second coupling means and guiding means.

In one embodiment, the first part and the second part of the brake device is a first yoke and a second yoke of a brake calliper, respectively, and may be arranged as an upper and lower yoke.

According to a second aspect, the invention also provides a method of servicing at least a part of a brake device from a brake disc, wherein the method comprises the steps of:
a) arranging a frame in a fixed position relative to the brake disc,
b) securing said part of the brake device to the frame,
c) moving said part of the brake device from a first position on the frame to a second position on the frame, and
d) servicing said part of the brake device.

Servicing in terms of the invention may include mounting or demounting said part from the brake device or simply moving the part of the brake device to a position, where the part may be serviced, e.g. changing brake pads or the like, or simply where said part may be inspected by a service technician.

As previously mentioned, the first position may be a position where the part is mounted in an operating position on the brake disc, and the second position may be a position, where said part can be serviced or removed from the brake disc.

The brake device is a preferably yaw brake for a wind turbine.

The frame is preferably arranged on a brake disc being arranged in a substantially horizontal plane.

In an advantageous embodiment, said part of the brake device is prior to step c) detached from the brake device.

In another advantageous embodiment, said part of the brake device is a yoke of a brake calliper.

In yet another advantageous embodiment, step a) involves mounting the frame directly to the brake disc of the brake system.

According to another aspect, a servicing system for servicing a brake device of a brake system comprising the brake device and a brake disc, wherein the servicing system includes a frame, and wherein the servicing system further comprises:
- mounting means for mounting the frame in a fixed position relative to the brake disc,
- supporting means which are adapted to allow the brake device to be moved on the frame relative to the brake disc, and,
- lifting means which are adapted to allow the brake device to be raised or lowered relative to the brake disc.

According to another aspect, the invention also provides a method for servicing a brake device of a brake system comprising the brake device and a horizontally arranged brake disc braked by the brake device, comprising the steps of:
- mounting a frame on the brake disc,
- moving the brake device away from the brake disc in a direction generally perpendicular to the rotational axis of the brake disc such that the brake device is supported on the frame, and,
- moving the brake device in a direction away from the frame in a direction generally parallel to the rotational axis of the brake disc such that the brake device is raised or lowered relative to the brake disc and the frame.

BRIEF DESCRIPTION OF THE FIGURES

The invention is explained in detail below with reference to embodiments shown in the drawings, in which FIGS. 9a-h show the servicing system of FIG. 8 and steps in using the system for servicing of a yaw brake.

DETAILED DESCRIPTION OF THE INVENTION

Figure 1:
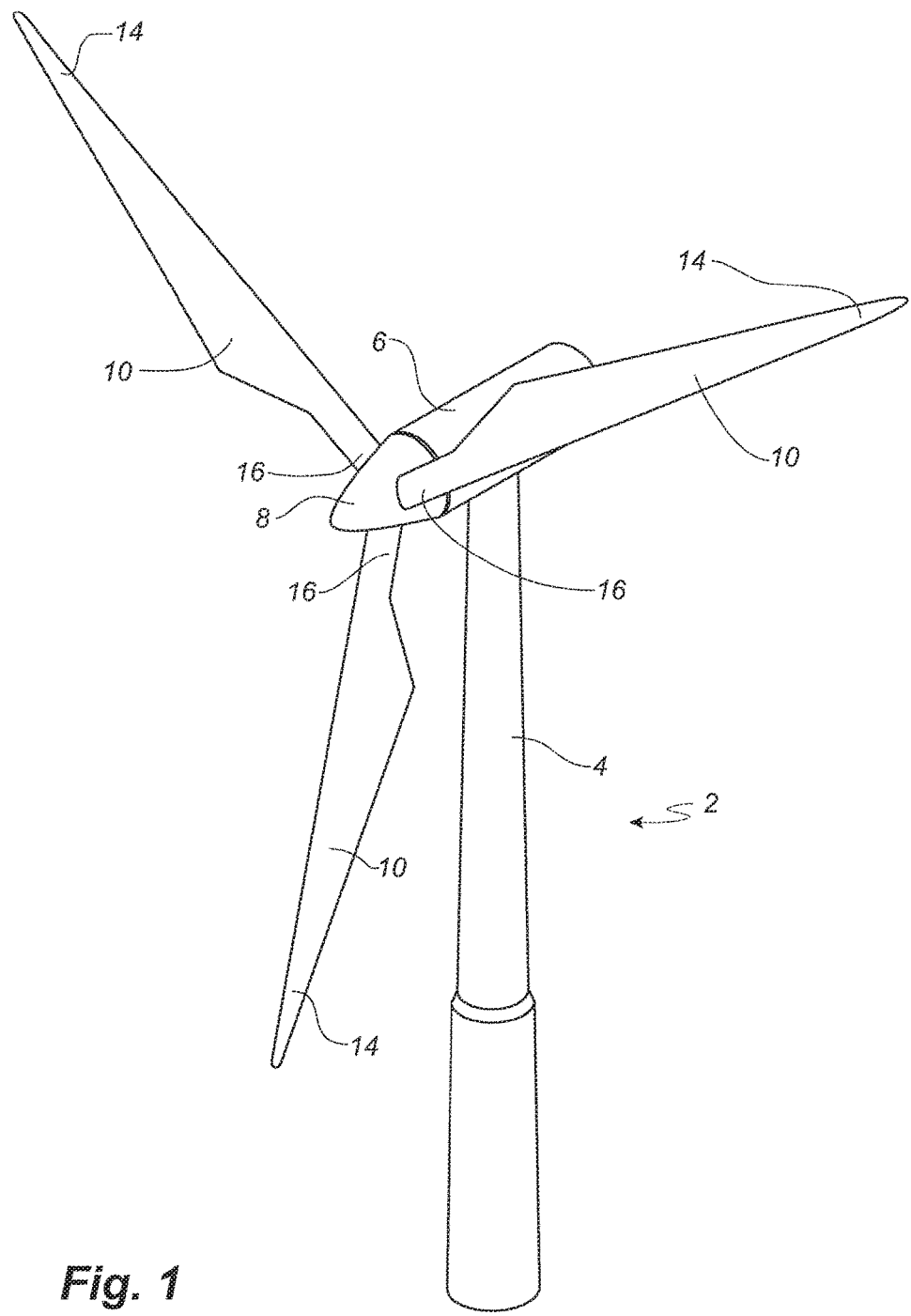
FIG. 1 shows a wind turbine.
Figure 2:
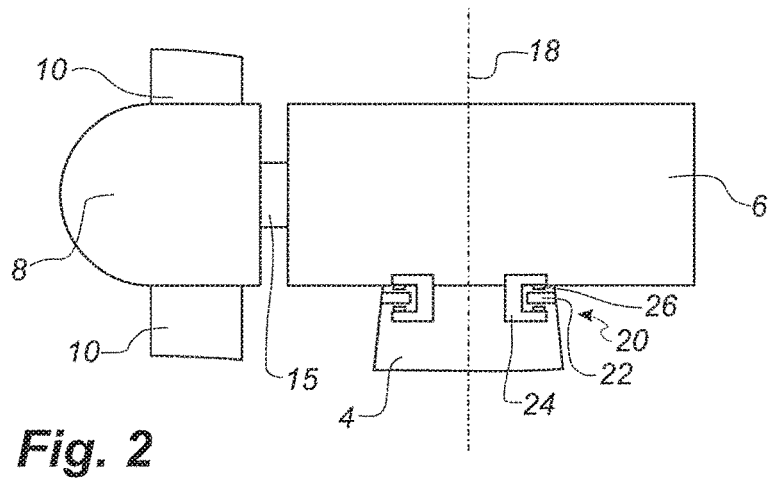
FIG. 2 shows a wind turbine provided with a yaw brake.

FIGS. 1 and 2 illustrate a conventional modern upwind wind turbine 2 according to the so-called "Danish concept" with a tower 4, a nacelle 6 and a rotor with a substantially horizontal rotor shaft 15. The rotor includes a hub 8 and three blades 10 extending radially from the hub 8, each having a blade root 16 nearest the hub and a blade tip 14 farthest from the hub 8. The rotor has a radius denoted R.

The wind turbine 2 comprises a yaw system, which controls the orientation of the wind turbine rotor relative to the prevailing wind direction. The yaw system allows the nacelle 6 or machine housing to be rotated around a vertical or yaw axis 18 relative to the tower 4. The yaw system may for instance comprise a yaw drive (not shown), e.g. in form of a gear, that may engage a toothed yaw bearing. The teeth may be provided on the inner ring or outer ring of the yaw bearing. The yaw drive is typically attached to the nacelle 6, whereas the yaw bearing is made stationary with respect to the tower 4. After the yaw adjustment of the nacelle 6, the nacelle is immobilised by use of a yaw brake system 20 that comprises a brake disc 22 and a number of brake units or brake devices 24 that are arranged around the brake disc 22. The brake disc 22 may be integrated with the yaw bearing, or it may be a separate unit of the yaw and brake system. The brake units preferably comprises a brake calliper 24 having jaw parts or yokes that straddle the brake disc 22. The brake units are preferably hydraulically actuated, e.g. via a piston that applies brake force to brake pads 26 that engage with the brake disc 22 and in turn apply a braking torque due to the friction of the brake pads 26. However, other activation means may be applicable, such as electromagnetic or pneumatic activations means. Pistons and brake pads are preferably provided both on the upper jaw and the lower jaw of the calliper 24. Alternatively, only the upper jaw is provided with a brake pad, whereas the lower jaw may be provided with sliding pads.

The yaw system often comprises a toothed brake disc or ring fixed to the tower and a motor activated gear attached to the nacelle and meshing with the toothed gear so that activation of the motor results in a revolving of the nacelle thereby producing the yaw motion of the nacelle. The yaw drive or gear may also as previously mentioned be separated from the brake disc.

Figure 3:
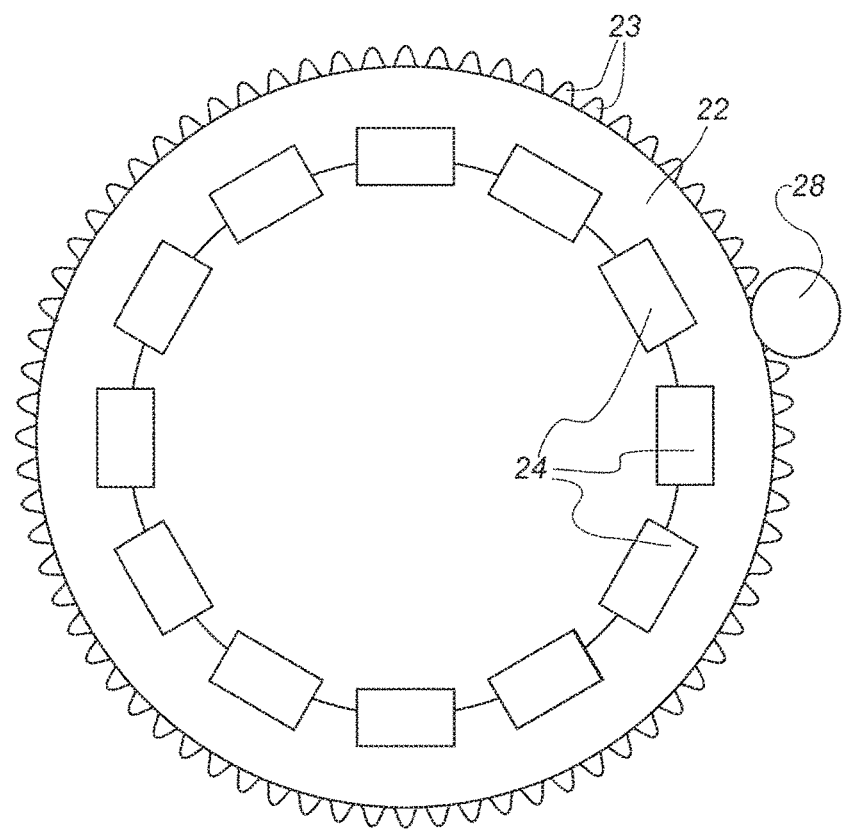
FIG. 3 shows a yaw brake comprising a brake disc and a number of brake callipers.

FIG. 3 shows an embodiment, where the toothed yaw bearing and the brake disc 22 are integrally formed. The disc 22 comprises teeth 23 provided on an outer periphery of the disc 22. A number of brake callipers 24 are arranged annularly around the disc ring along the inner periphery. As previously mentioned, the teeth may alternatively be provided on the inner periphery of the ring, and the brake callipers may be arranged along the outer periphery of the ring. A yaw drive or gear 28 is provided to engage with the teeth 23 so as to yaw the nacelle 6 around the vertical axis 18 of the tower 4.

Yaw brakes are engaged for long periods of times compared to other brake systems and are therefore particularly prone to wear and contamination. Therefore, yaw brakes need regular service. Accordingly, there is a need for service systems and methods that allow for more efficient service of the yaw brakes.

FIGS. 4a-g show a serving system according to the invention for servicing yaw brakes and steps in using the system for servicing a yaw brake.

Figure 4A:
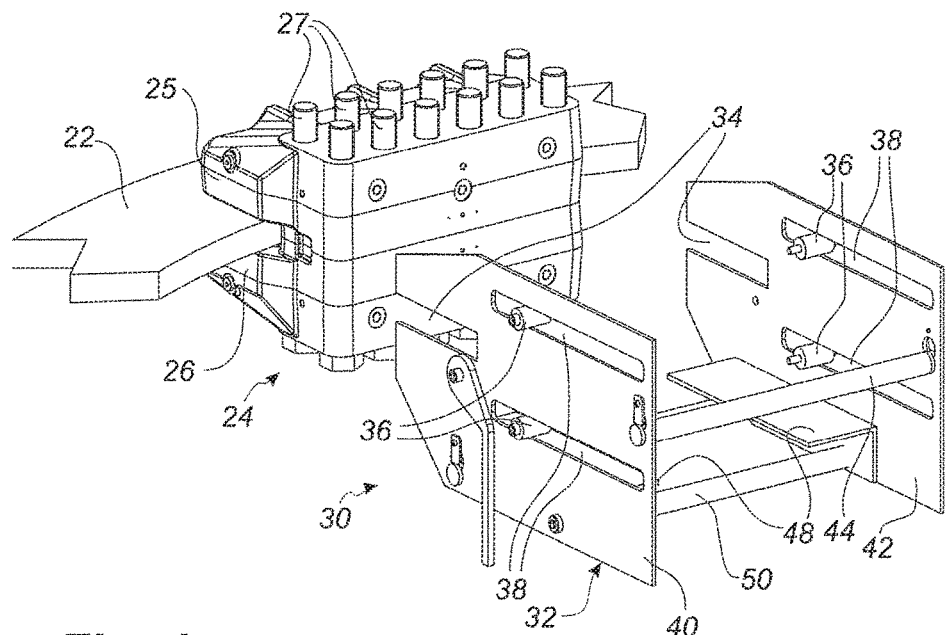
FIGS. 4a-g show a serving system according to the invention for servicing yaw brakes and steps in using the system for servicing of a yaw brake.
Figure 4B:
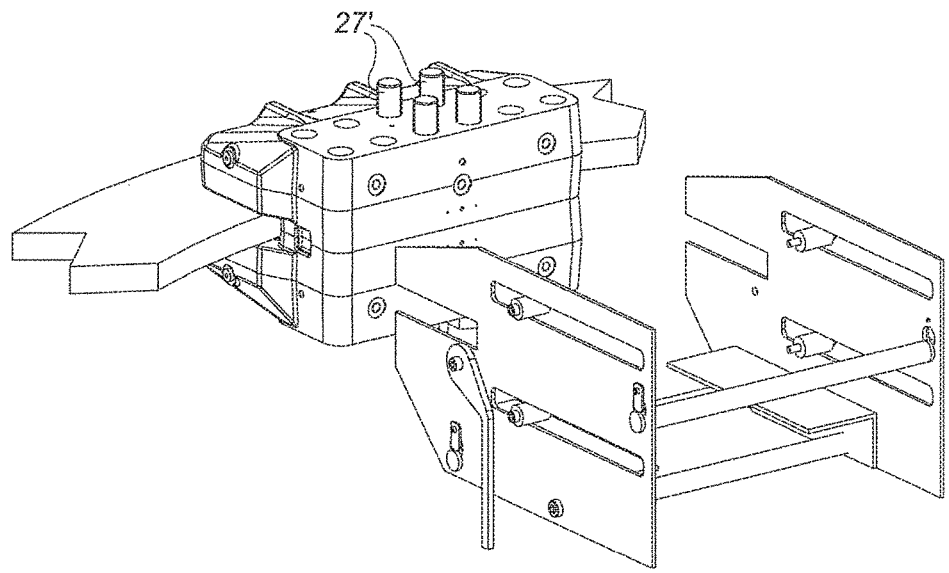

FIG. 4a shows a brake device 24 in form of a brake calliper, which is arranged in an operating position on ring-shaped brake disc 22. The brake device 24 comprises a first yoke 25 or jaw part, and a second yoke 26 or jaw part, which in an operating position straddle the brake disc 22. The brake device 24 is attached to the machine housing (not shown) of the wind turbine blade via a plurality of bolts 27.

Figure 4C:
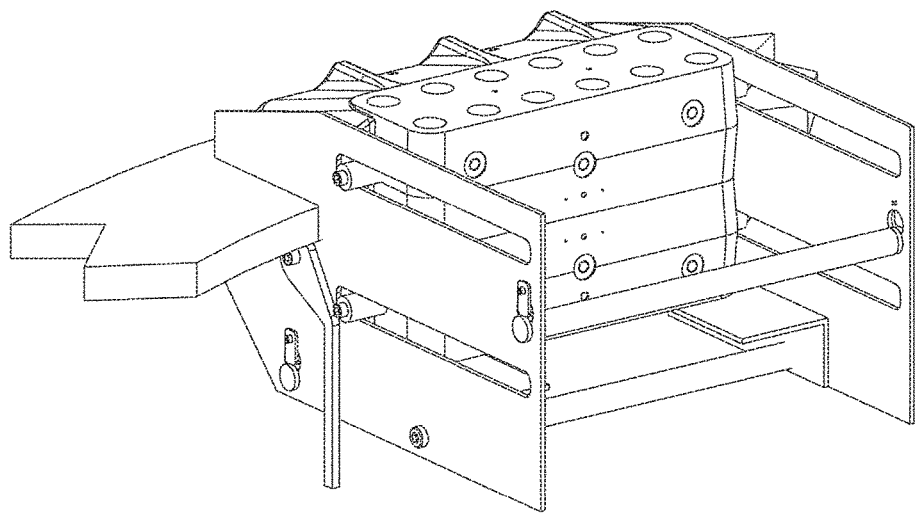

FIG. 4a also shows a servicing system 30 for servicing the brake device 24. The servicing system 30 includes a frame 32, which comprises a first side frame 40 and a second side frame 42. The side frames 40, 42 are provided with mounting means 34 in form of clamps or similar, which can be mounted directly to the brake disc 22, such that the frame 32 is mounted in a fixed position relative to the brake disc 22. The clamps may be adjustable in height so as to fit the thickness of the brake disc 22. The frame 32 further comprises a number of cross-bars that connect the first side frame 40 and the second side frame 42 and provide rigidity to the frame 32. The overall frame is designed such that the frame 32, when fixed to the brake disc 22, straddles the brake device 24 such that the first side frame 40 is located on a first circumferential side of the brake device 24 and the second side frame 42 is located on a second circumferential side of the brake device 24, as seen in FIG. 4c.

The first side frame 40 and the second side frame 42 are provided with guiding means 38 in form of slots. The servicing system 30 further comprises coupling means 36 in form of fixing pins, bolts or the like, which secure parts of the brake device 24 to the frame 32 via the slots 38. The parts of the brake device 24 may have e.g. threaded bores for providing a mating engagement with the coupling means.

The side frames 40, 42 are designed so that they are provided with a first or an upper slot and a second or lower slot. The upper and lower slots in each side frame 40, 42 may extend parallel to one another and longitudinally in a direction generally perpendicular to the yaw axis 18. First fixing pins are utilised to coupling the first yoke 25 to the frame 32 via the first slots, and second fixing pins are utilised to coupling the second yoke 26 to the frame 32 via the second slots.

The slots 38 are designed and adapted to allow the yokes 25, 26 of the brake device 24, while secured to the frame 32, to be moved on the frame 32 relative to the brake disc 22 from a first position wherein the respective yoke 25, 26 is mounted in an operating position on the brake disc 22, and to a second position, wherein the yoke 25, 26 can be serviced or removed from the brake disc 22.

As seen in FIG. 4a the side frames 40, 42 may further be provided with ledges 48 which may carry or support the brake device 24.

As mentioned, FIG. 4a shows the brake device 24 in an operating position on the brake disc 22, and where the brake device 24 is mounted to the machine housing via bolts 27. In a first step, shown in FIG. 4b, the bolts 27 are removed such that the brake device 24 is detached from the machine housing.

In a second step, shown in FIG. 4c, the frame 32 of the servicing system 30 is mounted on the brake disc 22 via the clamps 34. The fixing pins are attached to the sides of the first yoke 25 and the second yoke 26 through the first slots and the second slots, respectively. Further, bolts 27' which connect the first yoke 25 and the second yoke 26 are removed such that the first yoke 25 and the second yoke are detached from each other.

Figure 4D:
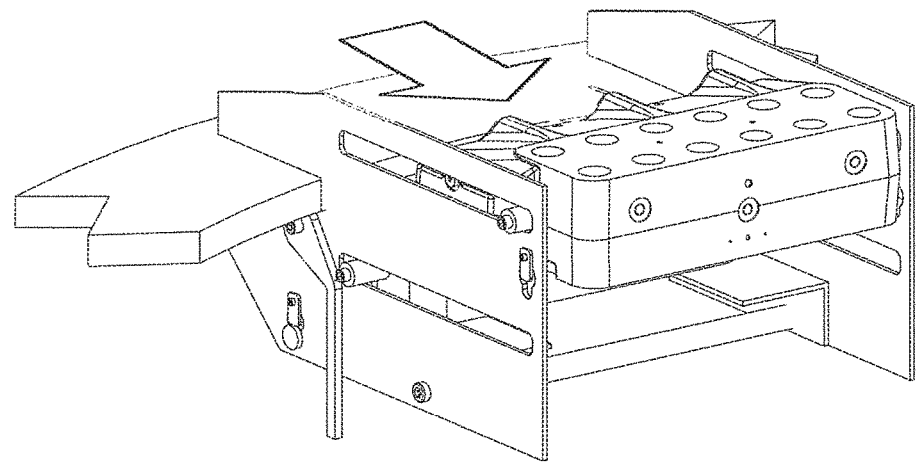
Figure 4E:
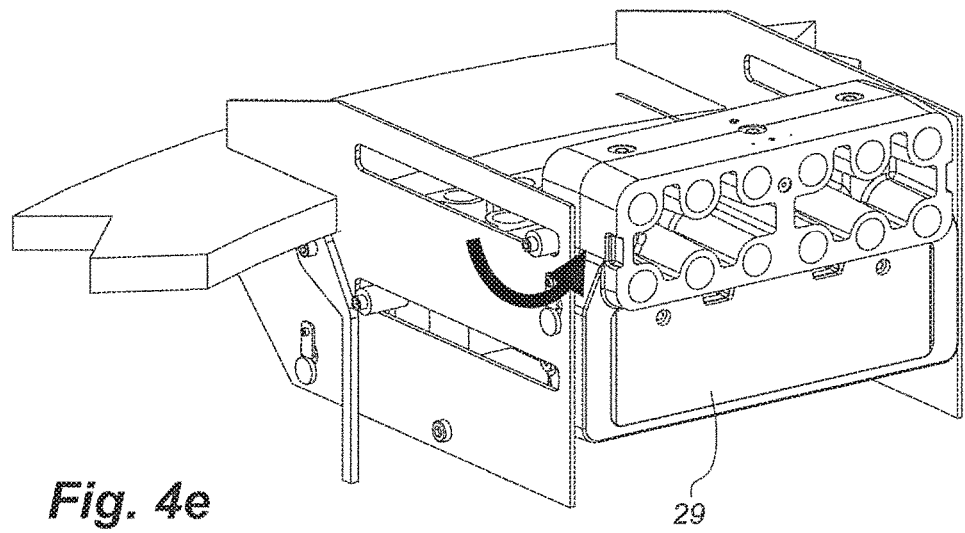
Figure 4F:
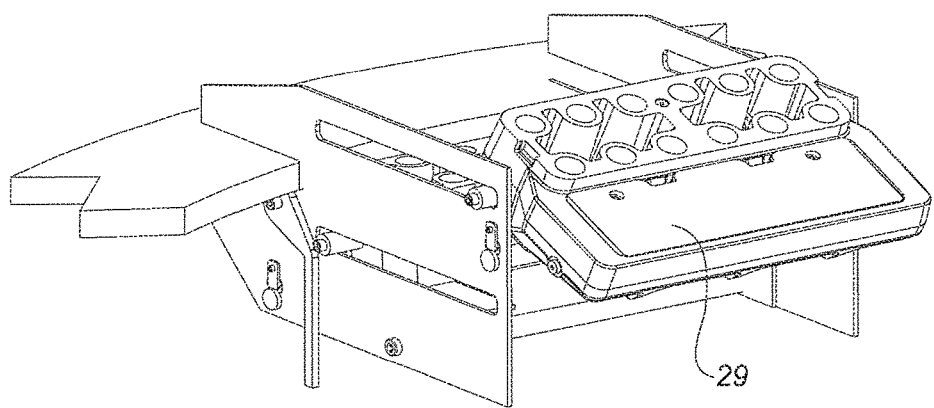

In a third step, shown in FIG. 4d, the first yoke 25 is linear translated on the frame along the first slots parallel to the plane of the brake disc 22 and perpendicular to the yaw axis 18. Then in a fourth step, shown in FIGS. 4e and 4f, the first yoke 25 is rotated on the frame 32 about an axis disposed in a plane perpendicular to axis 18 to a position, which allows the first yoke 25 to be serviced. One of the cross-bars 44 may be used as a stop, which the first yoke 25 can rest against. In the rotated position, a brake pad 29 of the first yoke 25 is exposed. Servicing may for instance involve removal, cleaning or replacement of the brake pad, other parts of the yoke 25 or the entire yoke 25. The servicing may also involve a simple inspection of the first yoke 25 by a service technician.

Figure 4G:
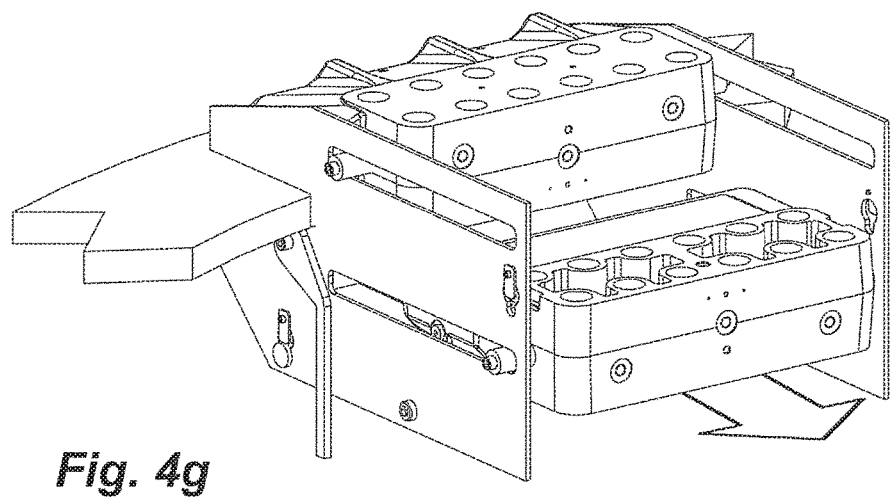

After servicing, the first yoke 25 may be returned to the first position in the operating position relative to the brake disc 22, and subsequently similar steps may, as shown in FIG. 4g, be repeated for the second yoke 26.

Figure 5:
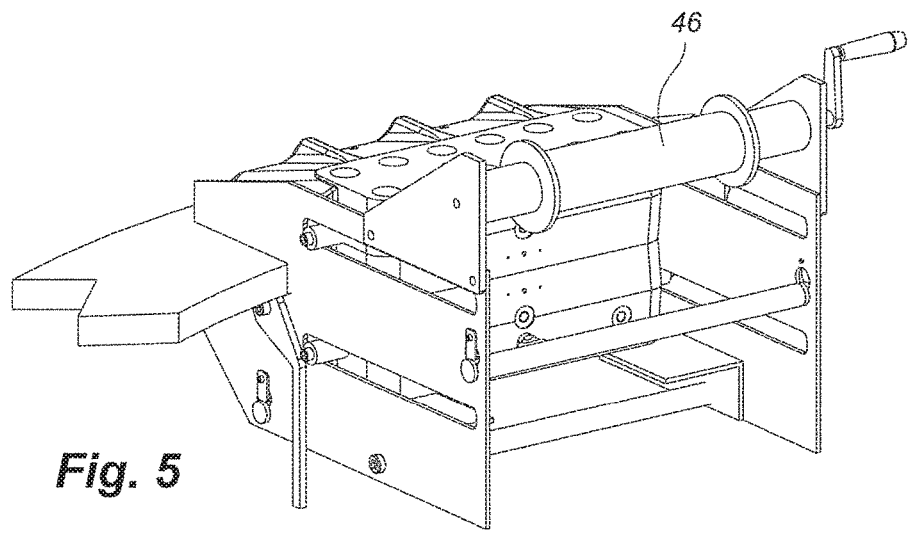
FIG. 5 shows a second embodiment of a servicing system according to the invention.

As shown in FIG. 5, the frame 32 may further be provided with a lifting device 46 e.g. in form of a winch. The part under service may be attached to the winch 46 via one or more cables and be lowered to a service platform in the wind turbine.

Figure 6:
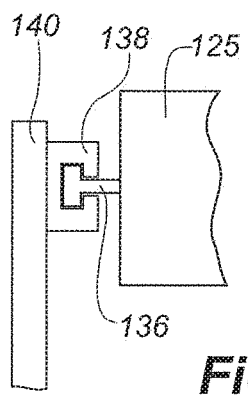
FIG. 6 shows a servicing system according to the invention with guiding means in form of rails.

While the invention in the previous has been described in relation to guiding means in form of slots and coupling means in form of fixing pins, it is recognised that other types of coupling means and guiding means may be used. It is for instance possible to use rails instead or in addition to the slots, and the coupling means may attach parts, e.g. the yokes, of the brake device to the rails such that the parts may be moved along the rails on the frame. An illustration of such a rail and coupling system is shown in FIG. 6, showing a pin or a bolt 136 connected to a yoke 125, wherein a head of the pin or bolt 136 is arranged in a rail 138, which is connected to a first side frame 140.

Figure 7:
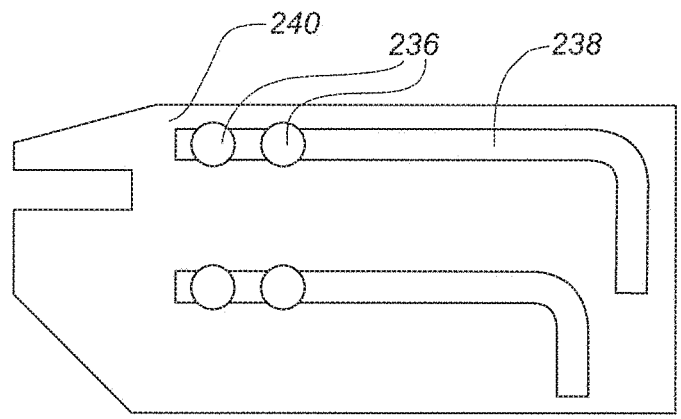
FIG. 7 shows an embodiment where the guiding means are designed with a curve.
Figure 8:
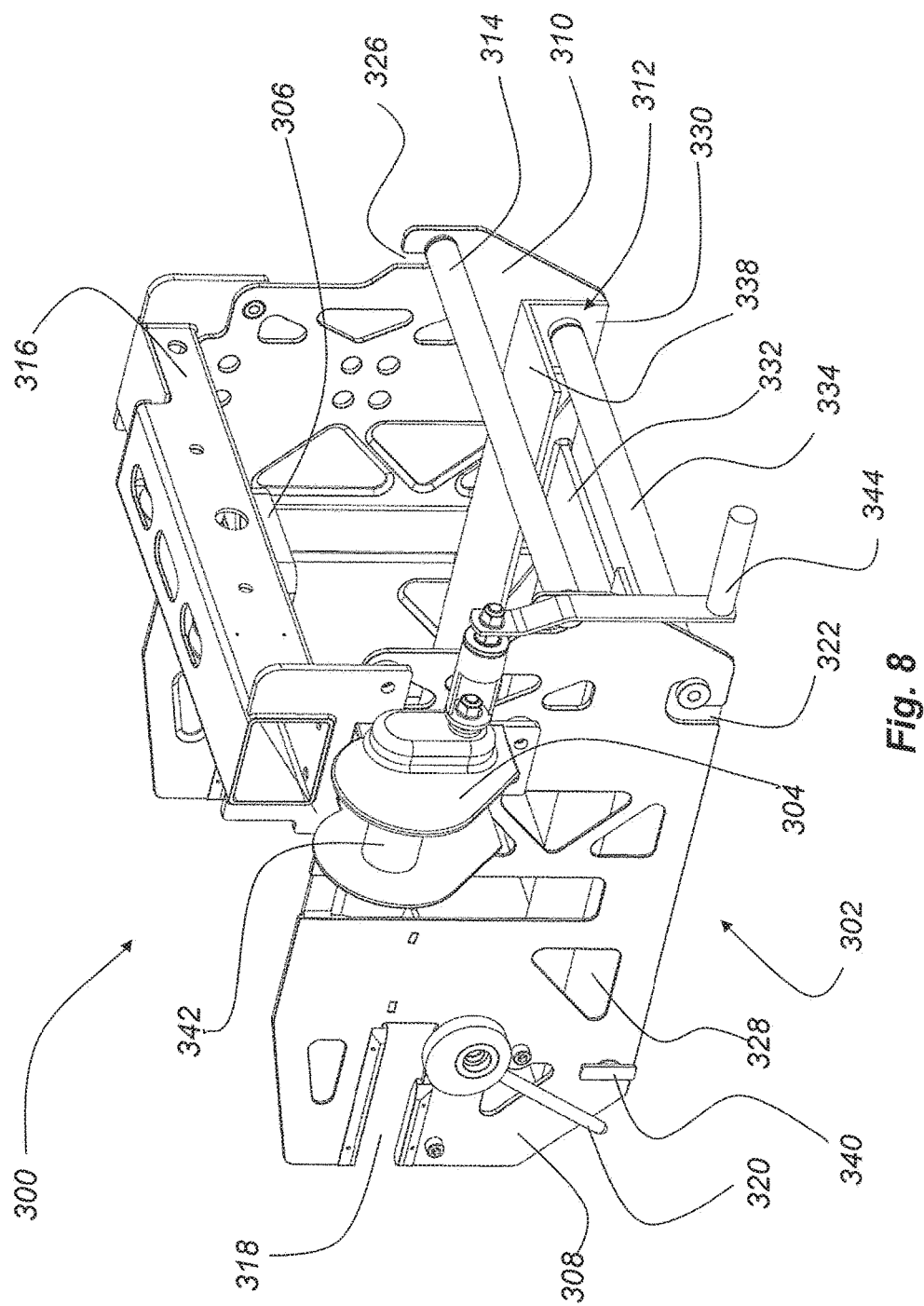
FIG. 8 shows another embodiment of a servicing system according to the invention for servicing yaw brakes.

The invention has in the previous described in relation to having horizontal slots and only a single pin on each side of the yoke to secure the yoke to the frame. However, as shown in FIG. 7, it is also possible to use two pins or bolts 236 on each side of the yoke, wherein the pins or bolts are attached at two different radial positions on the side of the yoke. Thereby, the yoke may be secured to the frame 240 and be carried without having a tendency to rotate on the frame due to its own weight. The rail or slot 238 may further be designed such that the yoke is automatically rotated to a particular service position as the yoke is moved along the frame. This may simply be achieved by curving the rail or slot 238, e.g. as shown in FIG. 7.

The invention has been described in relation to yaw brakes of a wind turbine. However, the invention is in general applicable to all brake systems having a horizontally arranged brake disc. Accordingly, the invention is also applicable to other industry application, such as for instance slew brakes on cranes.

Further, the frame 32 has been described as a single device, which is mounted to the brake disc 22. However, it would also be possible to assemble the frame on the brake disc 22, e.g. by mounting the side frames 40, 42 separately on the brake disc 22 and then adjusting the position of the side frames to couple the brake yoke to the side frames 40, 42. As previously described the frame may be stiffened with cross bars. The length of the cross bars may be adjustable in length, e.g. via a telescope arrangement, such that the frame may be fitted exactly to the brake device.

FIGS. 8 and 9a-h show a servicing system 300 according to another embodiment of the invention for servicing yaw brakes as well as steps in a method of using the system for servicing a yaw brake. System 300 includes a frame 302 and lifting means, including winch 304 and lifting plate 306, which are adapted to allow the brake device 24 to be raised or lowered relative to the brake disc 22.

Frame 302 provides a mechanism for mounting system 300 to brake disc 22 and supporting brake device 24 as it is moved relative to brake disc 22. Frame 302 may include side frame members 308, 310, shelf frame member 312, cross bar 314 and gantry frame member 316.

Side frame members 308, 310 may be mirror images of one another and includes means for mounting the frame 302 in a fixed position relative to the brake disc 22. In particular, each side frame member defines a recess 318 configured to receive a portion of brake disc 22. Recesses 318 may be substantially rectangular in shape such that the recesses 318 are disposed on both circumferential sides of brake disc 22 and a radially inner (in the illustrated embodiment) or outer edge of brake disc 22. Means may be provided on one or both of sides of the recesses 318 facing the circumferential sides of brake disc 22 for clamping brake disc 22 to better secure servicing system 300 to brake disc 22. The clamping means may, for example, comprise an eccentric clamp or cam clamp in which rotation of handles 320 on each side frame member 308, 310 causes corresponding rotation of cams between one position in which the cams force a clamping member to engage brake disc 22 and a second position in which the cams releases the clamping member from brake disc 22. The clamping means is arranged in such a way that the clamping force increases in response to an increasing in forces attempting to pull system 300 off of brake disc 22. Side frame members 308, 310 each also define aligned slots and apertures configured to receive portions of shelf frame member 312, cross bar 314 and gantry frame member 316. Side frame members 308, 310 may each define a substantially J-shaped slot 322 proximate one end of side frame members 308, 310 configured to receive and support one end of shelf frame member 312 and an aperture 324 (see FIG. 9*b*) proximate another end of side frame members 308, 310 through which the opposite end of shelf frame member 312 may be coupled to side frame members 308, 310 as described in more detail hereinbelow. Side frame members 308, 310 may each further define another J-shaped slot 326 disposed proximate one end of side frame members 308, 310 configured to receive cross bar 314. Finally, side frame members 308, 310 may define a plurality of apertures (not shown) configured to align with corresponding apertures in gantry frame member 316 and winch 304 through which fasteners may be extend to couple gantry frame member 316 and winch 304 to one or both of side frame members 308, 310.

Shelf frame member 312 provides structural support to frame 302 and provides means for supporting brake device 24 when brake device 24 is removed from brake disc 22. In the illustrated embodiment, shelf frame member 312 includes side members 328, 330, a cross member 332 and cross bars 334, 336 (see FIG. 9*d*). Side members 328, 330 are substantially L-shaped in cross-section and the two legs of each member 328, 330, may be joined by one or more gussets for added strength. One leg of each member 328, 330 forms a ledge 338 configured to support brake device 24 and adapted to allow the brake device 24 to be moved on the frame 302 relative to the brake disc 22 in a direction generally perpendicular to the axis of rotation of brake disc 22. The other leg of each member is configured to receive and engage corresponding ends of cross member 332 and cross bars 334, 336. In particular, the leg defines apertures (best seen in FIG. 9*g*) configured to receive cross bars 334, 336. The apertures that receive cross bar 336 may be elongated in a direction perpendicular to the axis of rotation of brake disc 22 for a purpose described below. Side members 328, 330 are spaced from one another and extend longitudinally away from brake disc 22 in a direction perpendicular to the axis of rotation of brake disc 22. Cross member 332 may comprise be generally rectangular in shape and connects side members 328, 330 to provide additional structural support to shelf frame member 312. In the illustrated embodiment, a single cross member 332 is disposed intermediate the longitudinal ends of side members 328, 330. It should be understood, however, that the number, shape and location of cross members 332 may vary. Cross bars 334, 336 are generally circular in cross-section and connect side members 328, 330 to provide structural support to shelf frame member 312. Cross bar 334 extends through apertures in side members 328, 330 and is configured to be received within slots 322 in side frame members 308, 310. During assembly, shelf frame member 312 is positioned such that cross bar 334 is received within the open ends of slots 322 and moved through the slots 322 to the closed ends of slots 322. Shelf frame member 312 is then rotated within the closed ends of slots 322 about an axis extending through cross bar 334 to bring the opposite end of shelf frame member 312 to a position in between side frame members 308, 310. Wing bolts 340 are inserted through apertures 324 in side frame members 308, 310, aligned apertures in side members 328, 330 and into corresponding apertures in cross bar 336 to couple that end of shelf frame member 312 to side frame members 308, 310.

Cross bar 314 provides a means limiting movement of brake device 24 away from brake disc 22 and for retaining brake device 24 on shelf frame member 312. Cross bar 314 is configured to be received within slots 326 in side frame members 308, 310 and is configured to engage one side of brake device 24. In the illustrated embodiment, cross bar 314 is substantially round in shape. It should be understood, however, that the shape of cross bar 314 may vary.

Gantry frame member 316 provides support for components used to raise and lower brake device 24 relative to brake disc 22. In the illustrated embodiment, member 316 defines a box like structure configured to house lifting plate 306 and pulleys (not shown) on either side of lifting plate 306 for a purpose described hereinbelow. It should be understood, however, that the size, shape and orientation of gantry frame member 316 may vary depending on structure of the lifting means employed. Gantry frame member 316 is configured for coupling to side frame members 308, 310 using conventional fasteners such as bolts or screws.

Winch 304 and lifting bracket 306 form a lifting means adapted to allow brake device 24 to be raised or lowered relative to brake disc 22. Winch 304 may be coupled to one of side frame members 308, 310. Winch 304 includes a drum 342 extending between opposed side plates and configured to support one end of rope, chain or cable wound about drum 342. A handle 344 can be used to rotate drum 342 about an axis of rotation that is generally perpendicular to the axis of rotation of brake disc 22. Lifting bracket 306 includes a base 346 (see FIG. 9*d*) configured for coupling to brake device 24 and, in particular, to an upper end of brake device 24 relative to earth ground. Base 346 may define one or more apertures 348 configured for alignment with corresponding apertures in brake device 24. In particular, apertures 348 may align with bolt holes in brake device 24 through which bolts normally extend to join the two yokes or jaws of brake device 24. Apertures 348 are configured to receive bolts or other fasteners that may be inserted through the bolt holes in brake device 24 and into apertures 348 in order to secure lifting bracket 306 to brake device 24. Lifting bracket 306 is coupled to winch 304 through the rope, chain or cable that extends from winch 304. In this manner, lifting bracket 306 is configured for movement with brake device 24 relative to frame 302 in response to movement of winch 304 to allow brake device 24 to be raised or lowered relative to brake disc 22. In accordance with one embodiment, lifting bracket 306 includes a pulley 350 (FIG. 9*h*) mounted on base 346. Pulley 350 may be supported for rotation between two arms extending upward from one side of base 346 and may be retained in position on the arms by a removable fastener. The rope, chain or cable has a first end affixed to the drum 342 of winch 304. The rope, chain or cable extends from drum 342 around one pulley (not shown) mounted to, and disposed within, gantry frame member 316 on one side of lifting bracket 306, around pulley 350, and around another pulley (not shown) mounted to, and disposed within, grant frame member 316 on the opposite side of lifting bracket 306. The opposite end of the rope, chain or cable is held in a fixed position within gantry frame member 316 by, for example, extending a fastener through two side walls of gantry frame member 316 and an eye at the end of the rope, chain or cable and securing the fastener. The illustrated embodiment employing multiple pulleys enables servicing system 300 to maintain a relatively short profile in a direction parallel to the axis of rotation of brake disc 22. It should be understood, however, that the means used to support and route the rope, chain or cable between winch 304 and lifting bracket 306 may vary and that lifting bracket 306 may be modified depending on the means used. In an alternative embodiment, for example, gantry frame member 316 may be configured with a single pulley and/or ramps over which the rope, chain, or cable are routed and lifting bracket 306 may be configured for coupling to an end of the rope, chain, or cable. In this embodiment, lifting bracket 306 may replace pulley 350 and its supporting arms with a hook, clip or similar structure configured to engage an eye formed in the end of the rope, chain or cable.

Referring to FIGS. 9a-h, a method of using servicing tool 300 to service brake device 24 will now be described in detail. The method may begin with certain steps prepare the brake device 24 for removal from brake disc 22. Referring to FIG. 9a, in one embodiment some of the bolts 27 coupling the two jaws or yokes of brake device 24 are removed (one or more bolts 27 may be left in brake device 24 in order to maintain brake device 24 in a partially assembled state). A pull handle (not shown) may also be inserted into brake device 24 to allow brake device 24 to be pulled away from brake disc 22 in subsequent steps.

Referring to FIG. 9b, once the brake device 24 is prepared for removal from brake disc 22, the method may continue with the step of mounting frame 302 to brake disc 22. Frame 302 may be fully assembled prior to mounting frame 302 on brake disc. Alternatively, portions of frame 302 may be mounted to brake disc 22 and the remainder of frame 302 simultaneously mounted to brake disc 22 and assembled to the portions already mounted on brake disc 22. In one embodiment, for example, side frame member 308 (on which winch 304 is mounted) and gantry frame member 316 (in which lifting bracket 306 is received) are preassembled and mounted as a unit onto brake disc 22. Thereafter, side frame member 310 is mounted onto brake disc 22 and coupled to the other side of gantry frame member 316. Side frame members 308, 310 are mounted in such a manner that side frame members 308, 310 engage both circumferential sides of brake disc 22. In particular, side frame members 308, 310 are moved towards brake disc 22 such that brake disc 22 is received within recesses 318 in side frame members 308, 310. Thereafter, handles 320 may be rotated to clamp side frame members 308, 310 on the circumferential sides of brake disc 22.

Referring to FIG. 9c-d, after side frame members 308, 310 are assembled and clamped to brake disc 22, assembly of frame 302 may continue by joining shelf frame member 312 and cross bar 314 to side frame members 308, 310. Shelf frame member 312 may be positioned such that cross bar 334 of shelf frame member 312 is aligned with slots 322 in side frame members 308, 310 and moved within the slots 322 until cross bar 334 reaches the end of slots 322 and is supported by side frame members 308, 310. Thereafter, shelf frame member 312 may be rotated about an axis extending through cross bar 334 to move the other end of shelf frame member 312 to a position where the end is disposed between side frame members 308, 310. Wing bolts 340 are then inserted through apertures 324 in side frame members 308, 310, aligned apertures in side members 328, 330 of shelf frame member 312, and into corresponding apertures in crossbar 336 to couple that end of shelf frame member 312 to side frame members 308, 310. Cross bar 314 may be positioned such that cross bar 314 is aligned with slots 326 in side frame members 308, 310 and moved within the slots 326 until cross bar 314 reaches the end of slots 326 and is supported by side frame members 308, 310.

Once frame 302 is fully assembled, the method may continue with the step of moving brake device 24 away from brake disc 22 in a direction generally perpendicular to the rotational axis of brake disc 22 and supporting brake device 24 on frame 302. This step may include several substeps. Referring to FIG. 9d, any remaining bolts 27 coupling the two jaws or yokes of brake device 24 may be removed and brake device 24 may be lowered onto ledges 338 of side members 328, 330 of shelf frame member 312 for support. Next, brake device 24 may be moved away from brake disc 22 by sliding brake device 24 along ledges 338 using, for example, the pull handle referenced hereinabove. Referring to FIG. 9e, cross bar 314 limits the distance brake device 24 may be moved in this direction to prevent brake device 24 from falling off of ledges 338. Once brake device 24 is adequately positioned on ledges 338, any pull handle previously inserted into brake device 24 may be removed.

Referring now to FIGS. 9f-h, after moving brake device 24 away from brake disc 22, the method may continue with the step of moving brake device 24 in a direction away from the frame 302 in a direction generally parallel to the rotational axis of the brake disc 22 such that brake device 24 is raised or lowered relative to the brake disc 22 and frame 302. This step may also include several substeps. Referring to FIG. 9f, lifting bracket 306 is first coupled to brake device 24. In accordance with one aspect of the present teachings, bolts 352 or other fasteners are inserted through the bolt holes in brake device 24 that are normally used to couple to the two jaws or yokes of brake device 24 and into aligned apertures 348 (see FIG. 9d) in lifting bracket 306. Next, winch 304 is operated to raise or lower the lifting bracket 306 and brake device 24. In order to remove brake device 24 and lower device 24 to a floor, for example, winch 304 is first rotated in one direction to raise brake device 24 off of ledges 338 of shelf frame member 312. Referring to FIG. 9g, shelf frame member 312 may then be moved out of the vertical path of travel of brake device 24. Wing bolts 340 may be loosened sufficiently to allow the other components of shelf frame member 312 to move relative to cross bar 336 (by virtue of the elongated apertures in side members 328, 330 in which the ends of cross bar 336 are disposed) and to thereby allow cross bar 334 to be maneuvered out of slots 322 such that shelf frame member 312 may be rotated about an axis extending through cross bar 336 to move the opposite end of shelf frame member 312 out from between side frame members 308, 310. Referring to FIG. 9h, once shelf frame member 312 is removed, brake device 24 may be lowered by rotating winch 304 in the opposite direction to lower lifting bracket 306 and brake device 24.

It will be appreciated that brake device 24 can be reinstalled (e.g., following repair or maintenance) by reversing the steps set forth above.

| List of reference numerals | |
|---|---|
| 2 | wind turbine |
| 4 | Tower |
| 6 | Nacelle |
| 8 | Hub |
| 10 | Blade |
| 14 | blade tip |
| 15 | rotor shaft |
| 16 | blade root |
| 20 | yaw brake system |
| 22 | brake disc |
| 23 | Teeth |
| 24 | Brake device/brake calliper |
| 25, 125 | First part of brake device/first yoke/first jaw part |
| 26 | Second part of brake device/second yoke/second jaw part |
| 27, 27' | Bolts |
| 28 | yaw drive/gear |
| 29 | Brake pad |
| 30 | Servicing system |
| 32 | Frame |
| 34 | Mounting means/clamp |
| 36, 136, 236 | Coupling means/pin |
| 38, 138, 238 | Guiding means/slot/rail |
| 40, 140, 240 | First side frame |
| 42 | Second side frame |
| 44 | Stop |
| 46 | Lifting device/winch |
| 48 | Ledge |
| 50 | Cross bars |
| 300 | Servicing system |
| 302 | Frame |
| 304 | Winch |
| 306 | Lifting bracket |
| 308 | First side frame member |
| 310 | Second side frame member |
| 312 | Shelf frame member |
| 314 | Cross bar |
| 316 | Gantry frame member |
| 318 | Recess |
| 320 | Handle |
| 322 | Slot |
| 324 | Aperture |
| 326 | Slot |
| 328, 330 | Side members |
| 332 | Cross member |
| 334, 336 | Cross bars |
| 338 | Ledge |
| 340 | Wing Bolt |
| 342 | Winch drum |
| 344 | Winch handle |
| 346 | Lifting bracket base |
| 348 | Aperture |
| 350 | Pulley |
| 352 | Bolts |

The invention claimed is:

1. A servicing system (30 or 300) for servicing a brake device (24) of a wind turbine yaw brake system comprising the brake device (24) and a horizontally arranged brake disc (22), wherein the servicing system (30 or 330) includes a frame (32 or 302), and wherein the servicing system (30 or 330) comprises:
means (34 or 318) for mounting the frame (32 or 302) in a fixed position on the brake disc (22);
means (48 or 338) for supporting the brake device (24) which are adapted to allow the brake device (24) to be moved on the frame (32 or 302) relative to the brake disc (22); and,
means (46 or 304, 306) for lifting the brake device (24) which are adapted to allow the brake device (24) to be raised or lowered relative to the brake disc (22).

2. A servicing system (30 or 300) according to claim 1 wherein the means (34 or 318) for mounting the frame (32 or 302) is configured to engage first and second circumferential sides of the brake disc (22).

3. A servicing system (30 or 300) according to claim 1 wherein the frame (32 or 302) includes first and second side frame members (40, 42 or 308, 310) spaced from one another and configured to be disposed on opposite sides of the brake device (24) and the means (34 or 302) for mounting the frame (32 or 302) includes a first recess (34 or 318) formed in the first side frame member (40 or 308) and a second side recess (34 or 318) formed in the second side frame member (42 or 310).

4. A servicing system (30 or 300) according to claim 1 wherein the means (34 or 318) for mounting the frame (32 or 302) includes means for applying a clamping force to the brake disc (22).

5. A servicing system (30 or 300) according to claim 1 wherein the means (48 or 338) for supporting the brake device (24) comprises a ledge of the frame (32 or 302).

6. A servicing system (30 or 300) according to claim 1 wherein the means (48 or 338) for supporting the brake device (24) are adapted to allow the brake device (24) to be moved in a direction generally perpendicular to an axis of rotation of the brake disc (22).

7. A servicing system (300) according to any of claim 1 wherein the frame (302) includes first and second side frame members (308, 310) spaced from one another and including the means (318) for mounting the frame (302) and a shelf frame member (312) including the means (338) for supporting the brake device (24), the shelf frame member (312) having a first end configured for coupling to the first and second side frame members (308, 310) and movable between a first position in which a second end of the shelf frame member (312) opposite the first end is disposed between the first and second side frame members (308, 310) and a second position in which the second end of the shelf frame member (312) is not disposed between the first and second side frame members (308, 310).

8. A servicing system (300) according to claim 1 wherein the means (304, 306) for lifting the brake device (24) includes:
a winch (304) affixed to the frame (302); and,
a lifting bracket (306) coupled to the winch (304) and configured for coupling to the brake device (24), the lifting bracket (306) configured for movement with the brake device (24) relative to the frame (302) in response to movement of the winch (304) to allow said brake device (24) to be raised or lowered relative to the brake disc (22).

9. The servicing system (300) according to claim 1 wherein the frame (302) includes first and second side frame members (308, 310) spaced from one another and including the means (318) for mounting the frame (302), a shelf frame member (312) configured for coupling to the first and second side frame members (308, 310) and including the means (338) for supporting the brake device (24), and a gantry frame member (316) configured for coupling to the first and second side frame members (308, 310) and the means for lifting the brake device (24) includes a winch (304) affixed to the frame (302) and a lifting bracket (306) coupled to the winch (304) and configured to be received by the gantry frame member (316) and configured for coupling to the brake device (24), the lifting bracket (306) configured for movement with the brake device (24) relative to the frame (302) in response to movement of the winch (304) to allow the brake device (24) to be raised or lowered relative to the brake disc (22).

10. The servicing system (300) according to any of claim 9 wherein the lifting bracket (306) includes an aperture (348) configured for alignment with a corresponding aperture in the brake device (24) and configured to receive a fastener (352) extending through the brake device (24).

11. The servicing system (300) according to claim 8 wherein the lifting bracket (306) is configured for coupling to an upper end of the braking device (24) relative to earth ground.

12. A method for servicing a brake device (24) of a wind turbine yaw brake system comprising the brake device (24) and a horizontally arranged brake disc (22) braked by the brake device (24), comprising the steps of:
- mounting a frame (32 or 302) on the brake disc (22);
- moving the brake device (24) away from the brake disc (22) in a direction generally perpendicular to the rotational axis of the brake disc (22) such that the brake device (24) is supported on the frame (32 or 302); and,
- moving the brake device (24) in a direction away from the frame (32 or 302) in a direction generally parallel to the rotational axis of the brake disc (22) such that the brake device (24) is raised or lowered relative to the brake disc (22) and the frame (32 or 302).

13. The method of claim 12 wherein the mounting step includes engaging first and second circumferential sides of the brake disc (22).

14. The method of claim 12 wherein the step of moving the brake device (24) away from the frame (302) includes the substeps of:
- coupling a lifting bracket (306) supported on the frame (302) to the brake device (24); and,
- operating a winch (304) affixed to the frame (302) and coupled to the lifting bracket (306) to raise or lower the lifting bracket (306) and the brake device (24).

15. The method of claim 14 wherein the lifting bracket (306) is coupled to an upper end of the braking device (24) relative to earth ground.

16. A servicing system (30) for servicing a brake device (24) of a wind turbine yaw brake system comprising the brake device (24) and a horizontally arranged brake disc (22), wherein the servicing system (30) includes a frame (32), and wherein the servicing system (30) comprises:
- means (34) for mounting the frame (32) in a fixed position on the brake disc (22),
- means (36) for securing at least a part (25; 26) of the brake device (24) to the frame (32), and
- means (38) for guiding said part (25; 26) the brake device (24) which are adapted to allow said part (25; 26) of the brake device (24), while secured to the frame (32), to be moved on the frame (32) relative to the brake disc (22).

17. A servicing system (30) according to claim 16, wherein the means (38) for guiding said part (25; 26) of the brake device (24) are adapted to allow said part (25; 26) of the brake device (24) to move between a first position, wherein said part (25; 26) is mounted in an operating position on the brake disc (22), and a second position, wherein said part (25; 26) can be serviced or removed from the brake disc (22).

18. A servicing system (30) according to claim 16, wherein the means (38) for guiding said part (25; 26) of the brake device (24) are adapted to allow said part (25; 26) of the brake device (24) to move substantially parallel to a plane of the brake disc (22).

19. A servicing system (30) according to claim 16, wherein the means (36) for securing at least a part (25; 26) of the brake device (24) are adapted to allow said part (25; 26) of the brake device (24) to rotate relative to the frame (32).

20. A servicing system (30) according to claim 16, wherein the frame is further provided with a lifting device (46) for lowering or lifting said part relative to the frame.

\* \* \* \* \*